May 25, 1926.
A. B. SCHOPF ET AL
CORN POPPER
Filed Oct. 23, 1925
1,586,335
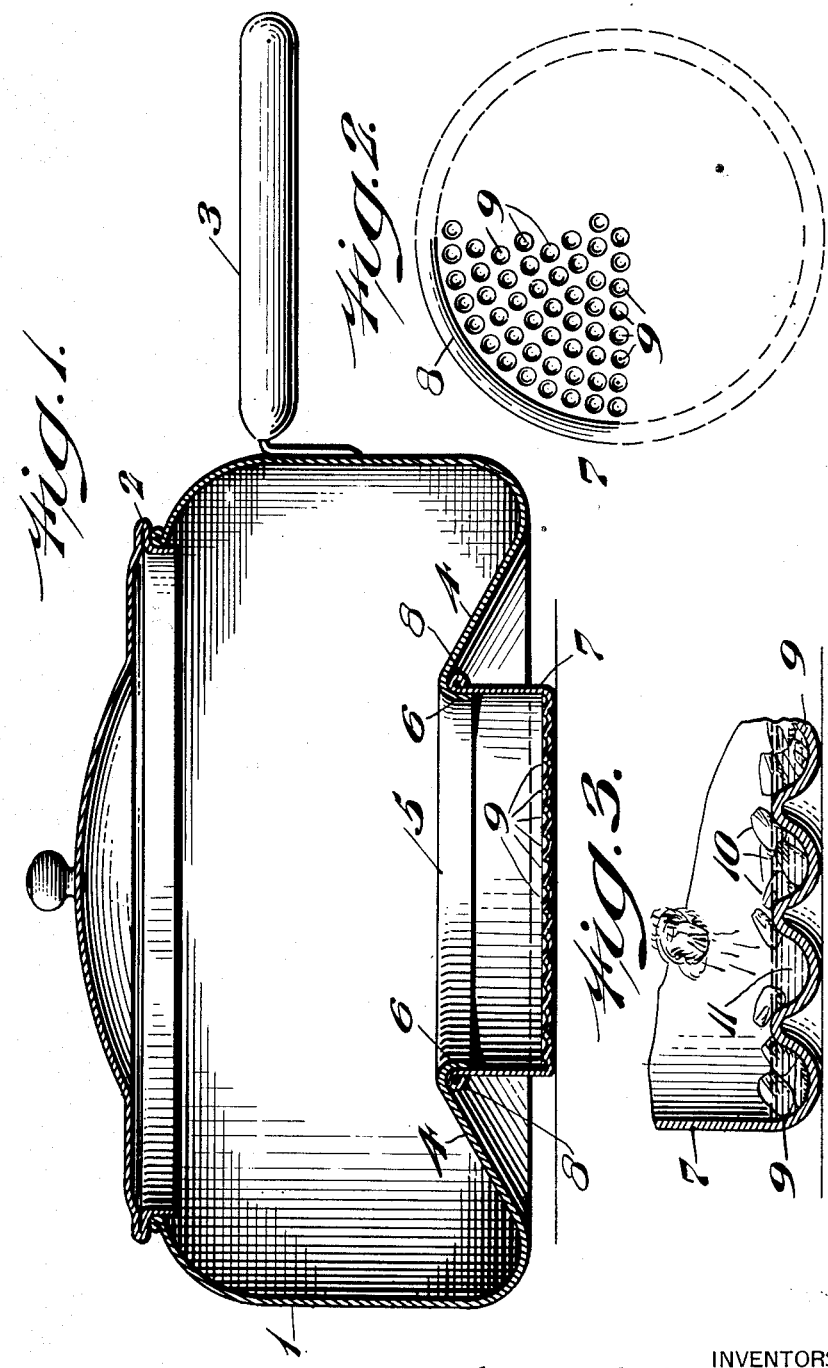
INVENTORS
ABRAHAM B. SCHOPF,
CLARENCE E. CARRUTH,
BY
ATTORNEYS.

Patented May 25, 1926.

1,586,335

UNITED STATES PATENT OFFICE.

ABRAHAM B. SCHOPF AND CLARENCE E. CARRUTH, OF DUBOIS, PENNSYLVANIA.

CORN POPPER.

Application filed October 23, 1925. Serial No. 64,284.

This invention, generally stated, relates to corn poppers and has more especial relation to a corn popper in which a pair of superimposed receptacles are provided the upper of which is adapted to receive the corn when popped, and the lower receptacle is adapted to receive the unpopped corn and a suitable liquid or like material through which the unpopped corn is adapted to be projected to the upper receptacle during a popping process.

The principal object of the present invention is to provide a simple, efficient and comparatively inexpensive device in which corn as popped is projected through a liquid material for impregnation, the popped corn being deposited in a contiguous receptacle in which latter receptacle the popped or coated corn may be retained in a warm or heated condition.

Other and further objects of the present invention reside in the provision of general details of construction and arrangement and combination of parts for attaining the results sought by the leading object.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in central section of a corn popper embodying the invention.

Fig. 2, is a more or less diagrammatic view in plan of the unpopped corn receiving receptacle shown in Fig. 1; and Fig. 3, is a fragmentary view in central section and drawn to an enlarged scale and illustrating the manner of projecting popped corn from the lower receptacle to the upper receptacle.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement of the instrumentalities as herein shown and described, Referring to the drawings in detail, the reference numeral 1 designates a popped corn receptacle preferably of sheet metal or the like, having an open top closed by a removable cover 2 and provided with a fixed handle 3. The bottom wall of the receptacle 1 is upwardly tapered as at 4 and is provided with a central opening 5. The central opening 5 is formed by turning the inclined walls 4 inwardly and downwardly at 6 to provide a centrally flanged opening. This upper receptacle 1 is adapted to receive the corn as popped and the popped corn in receptacle 1 is maintained in a heated or warm condition during a popping process. Adapted to be removably attached to the underside of the receptacle 1 in a manner to be presently described is a second receptacle 7 to receive a coating liquid or like material and kernels of pop corn. The receptacle 7 is relatively cup-shaped and is also formed of sheet metal or the like. The upper periphery of receptacle 7 is turned outwardly over upon itself to form a bead 8. This bead 8 in practice is strung over the flanged portion of the upper receptacle as clearly shown in Fig. 1. This connection is sufficient for the purposes desired since in practice the receptacle 7 practically rests upon a stove or other heating element during an entire popping process so that the frictional connection of the two receptacles is all that is necessary to maintain them in connected position. The bottom of the lower receptacle 7 is provided with a plurality of shallow cavities 9 of a size sufficient to accommodate two or more kernels of pop corn 10. Preferably arranged flush with the upper peripheries of the cavities 9 we introduce a liquid 11 which may be butter in liquid form, honey, liquid sugar, or other like material for cutting the kernels of corn during a popping period.

In practice the receptacle 7 contains the liquid 11 as above described and a hand full of corn kernels are thrown into the receptacle 7, two or more kernels of corn usually occupying a cavity 9, as clearly shown in Fig. 3. The receptacle 7 is then attached with respect to receptacle 1 and by means of handle 3 the operator moves the entire device over the heated stove or the like. As the kernels of corn begin to pop they are forced upwardly through the liquid 11 becoming impregnated therewith and are thrown or expelled into receptacle 1. As the inclined wall of receptacle 1 is immediately over the stove the popped corn is maintained in a heated or warm condition until the entire amount desired has been popped. Obviously, by removing cover 2 the popped corn can be readily emptied into a desired receptacle.

Having thus described our invention, what we claim as new and desire to secure by Letters Patent, is:

1. In a device of the character stated a popped corn receptacle, having a tapered bottom an unpopped corn receptacle therebelow, the latter receptacle having a bottom provided with a plurality of concentrically arranged, annular cavities therein to receive corn kernels, and means for securing said receptacles together.

2. In a device of the character stated a popped corn receptacle, an unpopped corn receptacle therebelow, the former having a tapered bottom and the latter receptacle having a closed bottom provided with a plurality of concentrically arranged, annular cavities therein to receive corn kernels and a liquid material, and means for securing said receptacles together.

3. In a device of the character stated a popped corn receptacle having an upwardly tapered bottom a removable lid and a handle, an unpopped corn receptacle below said tapered bottom, the latter receptacle having a bottom provided with a plurality of concentrically arranged, annular cavities therein to receive corn kernels, and means for securing said receptacles together.

4. In a device of the character stated, a popped corn receptacle having an upwardly tapered bottom with a central opening, an unpopped corn receptacle therebelow, the latter receptacle having a bottom provided with a plurality of cavities therein to receive corn kernels, and means for securing said receptacles together to close the said opening in said receptacle bottom.

In testimony whereof, we have hereunto signed our names.

ABRAHAM B. SCHOPF.
CLARENCE E. CARRUTH.